(12) United States Patent
Suzuki et al.

(10) Patent No.: US 7,665,297 B2
(45) Date of Patent: Feb. 23, 2010

(54) EXHAUST PURIFYING APPARATUS FOR INTERNAL COMBUSTION ENGINE

(75) Inventors: Hisanobu Suzuki, Toyota (JP); Yoshitaka Nakamura, Nagoya (JP); Yoshiyuki Takahashi, Kariya (JP); Yuzuru Ikeda, Kariya (JP); Shinichi Kusakabe, Kariya (JP); Tadashi Toyota, Kariya (JP)

(73) Assignees: Toyota Jidosha Kabushiki Kaisha, Toyota-shi (JP); Kabushiki Kaisha Toyota Jidoshokki, Kariya-shi (JP)

( * ) Notice: Subject to any disclaimer, the term of this patent is extended or adjusted under 35 U.S.C. 154(b) by 636 days.

(21) Appl. No.: 10/558,681

(22) PCT Filed: Mar. 14, 2005

(86) PCT No.: PCT/JP2005/004877

§ 371 (c)(1), (2), (4) Date: Nov. 30, 2005

(87) PCT Pub. No.: WO2005/090761

PCT Pub. Date: Sep. 29, 2005

(65) Prior Publication Data

US 2007/0079607 A1 Apr. 12, 2007

(30) Foreign Application Priority Data

Mar. 22, 2004 (JP) .............................. 2004-083537

(51) Int. Cl.
*F01N 3/00* (2006.01)

(52) U.S. Cl. ............................. 60/287; 60/278; 60/280; 60/285; 60/292; 60/299; 123/198 F; 123/481; 123/568.11; 123/568.19; 123/568.21

(58) Field of Classification Search .................. 60/274, 60/278, 280, 285, 286, 287, 292, 303, 299; 123/198 F, 481, 568.11, 568.12, 568.16, 123/568.19, 568.2, 568.21

See application file for complete search history.

(56) References Cited

U.S. PATENT DOCUMENTS 5,233,829 A * 8/1993 Komatsu ..................... 60/276
5,233,831 A * 8/1993 Hitomi et al. ................ 60/284

(Continued)

FOREIGN PATENT DOCUMENTS

EP    1 498 594 A1    1/2005

(Continued)

OTHER PUBLICATIONS

Corresponding Japanese Office Action, Appln. No. 2004-083537, PCT/JP2005-004877, dated Jul. 17, 2007.

(Continued)

*Primary Examiner*—Binh Q. Tran
(74) *Attorney, Agent, or Firm*—Kenyon & Kenyon LLP

(57) ABSTRACT

An internal combustion engine has a separate exhaust passage for each one of banks. An exhaust purifying catalyst is provided in each exhaust passage. The mass flow rates G1, G2 of exhaust gas that flow through the exhaust passages are individually estimated. The flow rate of exhaust gas is individually adjusted per each bank by controlling the operation of each one of exhaust gas recirculation valves such that the difference between the estimated mass flow rates G1, G2 is decreased.

8 Claims, 5 Drawing Sheets

U.S. PATENT DOCUMENTS

| | | | |
|---|---|---|---|
| 5,562,086 A * | 10/1996 | Asada et al. | 123/568.21 |
| 5,657,625 A * | 8/1997 | Koga et al. | 60/274 |
| 5,983,876 A | 11/1999 | Irons et al. | |
| 6,164,065 A * | 12/2000 | Denari et al. | 60/284 |
| 7,073,465 B2 * | 7/2006 | Woll et al. | 123/1 A |
| 7,448,205 B2 * | 11/2008 | Takahashi et al. | 60/285 |

FOREIGN PATENT DOCUMENTS

| | | |
|---|---|---|
| JP | 11-117786 | 4/1999 |
| JP | 2002-106393 | 10/2002 |
| JP | 2003-049629 | 2/2003 |
| JP | 2005-36663 A | 2/2005 |

OTHER PUBLICATIONS

Chinese Language Version of Chinese Office Action, Appln. No. 200200580001000.2 dated Sep. 21, 2007.

English Translation of Chinese Office Action, Appln. No. 200200580001000.2 dated Sep. 21, 2007.

* cited by examiner

EXHAUST PURIFYING APPARATUS FOR INTERNAL COMBUSTION ENGINE

This is a 371 national phase application of PCT/JP2005/004877 filed 14 Mar. 2005, which claims priority to JP 2004-083537 filed 22 Mar. 2004, the contents of which are incorporated herein by reference.

FIELD OF THE INVENTION

The present invention relates to an exhaust purifying apparatus applied to an internal combustion engine, which has several groups of cylinders each connected to a different one of exhaust purifying catalysts.

BACKGROUND OF THE INVENTION

In an internal combustion engine that employs V-type cylinder arrangement, a separate exhaust purifying catalyst is provided per bank having a group of cylinders. In such an internal combustion engine, if the bed temperatures of the exhaust purifying catalysts vary from one another, the purifying performance undesirably varies per the exhaust purifying catalyst. Therefore, it is difficult to appropriately perform an exhaust purifying control. That is, even if the exhaust purifying control is adjusted to a certain exhaust purifying catalyst, the exhaust purifying control is not suitable for another exhaust purifying catalyst having different bed temperature. Thus, the exhaust gas may not be sufficiently purified.

In the prior art, an exhaust purifying apparatus for a V-type internal combustion engine, which includes a separate exhaust purifying catalyst per bank, has been proposed. The exhaust purifying apparatus detects the bed temperature of each exhaust purifying catalyst and adjusts the ignition timing per bank through a feedback control (For example, Japanese Laid-Open Patent Publication No. 11-117786). The exhaust purifying apparatus reduces the variation of the catalyst bed temperatures by decreasing the temperature of exhaust gas by delaying the ignition timing of the bank having a higher catalyst bed temperature and increasing the temperature of exhaust gas by advancing the ignition timing of the bank having a lower catalyst bed temperature.

The variation of the catalyst bed temperatures is the main cause of variation of heat received by the exhaust purifying catalyst from exhaust gas. If the state of heat reception and heat radiation of the exhaust purifying catalyst are maintained constant, the variation in the amount of heat received by each exhaust purifying catalyst from exhaust gas is automatically corrected by equalizing the catalyst bed temperatures of the exhaust purifying catalysts. However, in the internal combustion engine of, for example, a vehicle, the temperature and the flow rate of exhaust gas change by a large amount when the operating condition is changed. Accordingly, the amount of heat received by the exhaust purifying catalyst fluctuates by a large amount. Therefore, even if the bed temperatures of the exhaust purifying catalysts temporarily become equal to one another, the amount of heat received by each exhaust purifying catalyst is not necessarily equal to that of the other catalyst. Thus, it is difficult to maintain the bed temperatures of the exhaust purifying catalysts to be equal to one another. Therefore, when the ignition timing is adjusted only based on the bed temperature of each exhaust purifying catalyst, delay and excess response in feedback adjustment or control hunting may occur.

SUMMARY OF THE INVENTION

Accordingly, it is an objective of the present invention to provide an exhaust purifying apparatus for an internal combustion engine that effectively suppresses variation of the purifying performance among exhaust purifying catalysts.

Means for achieving the above objectives and advantages thereof will now be discussed.

A first invention provides an exhaust purifying apparatus applied to an internal combustion engine, which has groups of cylinders. Each group is connected to different one of exhaust purifying catalysts. The apparatus includes estimating means and setting means. The estimating means individually estimates the flow rate of exhaust gas in each exhaust purifying catalyst. The setting means individually sets the control manner of each group of cylinders connected to the corresponding exhaust purifying catalyst in accordance with the estimated flow rate of exhaust gas of the exhaust purifying catalyst.

A second invention provides an exhaust purifying apparatus applied to an internal combustion engine, which has groups of cylinders. Each group is connected to different one of exhaust purifying catalysts. The apparatus includes estimating means, catalyst control means, and setting means. The estimating means individually estimates the flow rate of exhaust gas in each exhaust purifying catalyst. The catalyst control means is located upstream of the exhaust purifying catalysts. The catalyst control means individually varies the state of each exhaust purifying catalyst. The setting means individually sets the control manner of each catalyst control means in accordance with the estimated flow rate of exhaust gas in the exhaust purifying catalyst.

Variation might be caused in the flow rate of exhaust gas that passes through each exhaust purifying catalyst due to the difference in the volume filling efficiency of each cylinder, the difference in the flow characteristic of each exhaust gas recirculation device, and the difference in the characteristics of each supercharger. The fluctuation in the flow rate of exhaust gas causes the amount of heat received by the exhaust purifying catalysts from the exhaust gas to vary, thereby varying the catalyst bed temperatures. If the flow rate of exhaust gas varies, the speed of the nitrogen oxides storage and the sulfur poisoning of the exhaust purifying catalysts vary.

According to the first and second inventions, the flow rate of exhaust gas in each exhaust purifying catalyst is individually estimated. The control manner of each group of cylinders is individually set or the control manner of the catalyst control means, which individually changes the state of the exhaust purifying catalysts, is set in accordance with the estimated result. Therefore, the actual purifying characteristics of each exhaust purifying catalyst is accurately grasped from the flow rate of exhaust gas. Thus, an appropriate measure is taken in accordance with the variation.

The flow rate of exhaust gas may be estimated based on the exhaust temperature or the exhaust pressure, which have a strong correlation with the flow rate of exhaust gas. If the internal combustion engine includes an exhaust-gas driven supercharger, which supercharges cylinders by energy of exhaust gas, per each group of cylinders, the flow rate of exhaust gas can be estimated based on the boost pressure of the supercharger of each group of cylinders.

In the exhaust purifying apparatus for an internal combustion engine according to the first and second invention, the internal combustion engine has a first group of cylinders connected to a first exhaust purifying catalyst and a second group of cylinders connected to a second exhaust purifying catalyst that is separate from the first exhaust purifying catalyst. The internal combustion engine also has exhaust passages, which are merged together after exhaust gas of each group of cylinders pass through the corresponding exhaust purifying catalyst. The estimating means estimates the flow rate of exhaust gas by computing a mass flow rate G1 of exhaust gas that passes through the first exhaust purifying catalyst and a mass flow rate G2 of exhaust gas that passes through the second exhaust purifying catalyst based on a temperature T1 of exhaust gas that passes through the first exhaust purifying catalyst, a temperature T2 of exhaust gas that passes through the second exhaust purifying catalyst, a temperature T of exhaust gas after merging together, and a mass flow rate G of exhaust gas after merging together using the following equations (1) and (2):

$$G1 = G \times (T-T2)/(T1-T2) \quad (1)$$

$$G2 = G \times (T-T1)/(T2-T1) \quad (2)$$

As shown in FIG. 6, the mass flow rate G of exhaust gas that has passed through the exhaust purifying catalysts and merged together is computed as the sum of the mass flow rate G1 of exhaust gas that passes through the first exhaust purifying catalyst and the mass flow rate G2 of exhaust gas that passes through the second exhaust purifying catalyst.

$$G = G1 + G2 \quad (3)$$

On the other hand, a quantity of heat Q of the exhaust gas after being merged together, a quantity of heat Q1 of exhaust gas that passes through the first exhaust passage, and a quantity of heat Q2 of exhaust gas that passes through the second exhaust passage are represented by the following equations (4) to (6) on the assumption that T represents the temperature of exhaust gas after being merged together, T1 represents the temperature of exhaust gas that passes through the first exhaust purifying catalyst, T2 represents the temperature of exhaust gas that passes through the second exhaust purifying catalyst, and C represents the specific heat of exhaust gas.

$$Q = C \times T \times G \quad (4)$$

$$Q1 = C \times T1 \times G1 \quad (5)$$

$$Q2 = C \times T2 \times G2 \quad (6)$$

If the influence of decrease in the temperature of exhaust gas due to radiation of heat can be ignored, the quantity of heat Q of the exhaust gas after being merged together is equal to the sum of the quantities of heat Q1, Q2 of exhaust gas that passes through the exhaust purifying catalysts. Therefore, the following equation (7) is true.

$$G \times T = G1 \times T1 + G2 \times T2 \quad (7)$$

By solving the simultaneous equations that include the above equations (3), (7), the equations (1), (2) are obtained. Therefore, when the exhaust temperatures T, T1, T2 and the mass flow rate G of exhaust gas after being merged together are grasped, the flow rate of exhaust gas in each exhaust purifying catalyst is appropriately estimated.

It is desirable to use, as the exhaust temperatures T, T1, T2, values that are obtained by correcting the detection values of the temperature to compensate for the difference in the temperature change due to radiation of heat caused by the difference between the detection positions of the temperature. The temperature of exhaust gas decreases toward the downstream end by radiation of heat to the outside. That is, the quantity of heat of exhaust gas decreases toward the downstream end. Therefore, in the strict sense, the quantity of heat Q of exhaust gas after being merged together is slightly smaller than the sum of the quantities of heat Q1, Q2 of exhaust gas that passes through the exhaust purifying catalysts. In this regard, since this structure uses the value that has been compensated in accordance with the detection position of the temperature to estimate the flow rate of exhaust gas, the flow rate of exhaust gas is more accurately estimated.

Also, the mass flow rate G of exhaust gas after merging together is desirably computed as the sum of the total mass of fuel injected into the internal combustion engine per unit time and the mass flow rate of intake air.

The total mass of exhaust gas emitted from the cylinders is equal to the sum of the mass of gas and fuel supplied to the cylinders. Therefore, the mass flow rate G of exhaust gas after being merged together is equal to the sum of the total mass of fuel injected from the internal combustion engine per unit time and the mass flow rate of intake air, that is, the total mass of new air and recirculated exhaust gas supplied to the cylinders per unit time. Therefore, according to this structure, the mass flow rate G of exhaust gas after being merged together is accurately computed without directly detecting the mass flow rate G.

It is desirable that the setting means individually adjusts the flow rate of exhaust gas per group of cylinders such that the difference between the estimated flow rates of exhaust gas in the exhaust purifying catalysts is decreased.

According to this structure, the variation of the flow rate of exhaust gas in the exhaust purifying catalysts during operation of the engine is suppressed. Therefore, variation in the purifying characteristics between the exhaust purifying catalysts, such as the difference in the amount of heat received from exhaust gas and the difference between the speed of nitrogen oxides storage and the speed of sulfur poisoning, is suppressed in a suitable manner. If the internal combustion engine includes the exhaust gas recirculation device per each group of cylinders, the difference between the flow rates of exhaust gas in the exhaust purifying catalysts is decreased by individually adjusting the exhaust gas recirculation rate of each group of cylinders. If the internal combustion engine includes the variable displacement supercharger per each group of cylinders, the difference between the flow rates of exhaust gas in the exhaust purifying catalysts is decreased by individually adjusting the supercharging amount per each group of cylinders. Furthermore, the flow rates of exhaust gas in the exhaust purifying catalysts can be individually adjusted to reduce the difference between the flow rates of exhaust gas by a variable intake mechanism or a variable performance valve mechanism.

It is desirable that the setting means individually sets the amount of reducing agent added to each exhaust purifying catalyst per group of cylinders based on the estimated flow rate of exhaust gas in the exhaust purifying catalyst.

A reducing agent such as hydrocarbon and carbon monoxide is supplied by adding fuel to exhaust gas in order to purify nitrogen oxides and sulfur oxide stored in the exhaust purifying catalysts or accumulated particulate matter. The optimal amount of reducing agent to be added varies in accordance with the flow rate of exhaust gas that passes through each exhaust purifying catalyst. According to the above mentioned structure, the amount of reducing agent to be added to each exhaust purifying catalyst is individually set based on the estimated flow rate of exhaust gas in the exhaust purifying catalyst. Therefore, even if the flow rate of exhaust gas varies per the exhaust purifying catalyst, the optimal amount of reducing agent is added to each exhaust purifying catalyst.

It is desirable that the internal combustion engine includes intake passages, each corresponding to one of the first and second groups of cylinders, and an intake manifold connected commonly to the intake passages. An exhaust gas recirculation device that recirculates exhaust gas from each exhaust passage to the corresponding intake passage is provided for each group of cylinders. Each exhaust gas recirculation device has an exhaust gas recirculation passage, which separately connects the intake manifold to the corresponding exhaust passage, and an exhaust gas recirculation valve provided in each exhaust gas recirculation passage. The catalyst control means is constituted by the exhaust gas recirculation valve.

The third invention provides an exhaust purifying method applied to an internal combustion engine, which has groups of cylinders each group being connected to a different one of exhaust purifying catalysts. The method includes individually estimating the flow rate of exhaust gas in each exhaust purifying catalyst and individually setting the control manner of each group of cylinders connected to the corresponding exhaust purifying catalyst in accordance with the estimated flow rate of exhaust gas of the exhaust purifying catalyst.

DETAILED DESCRIPTION

One embodiment of the present invention will now be described.

An exhaust purifying apparatus for an internal combustion engine according to the preferred embodiment is applied to a V-type internal combustion engine, which has first and second banks.

Figure 1:
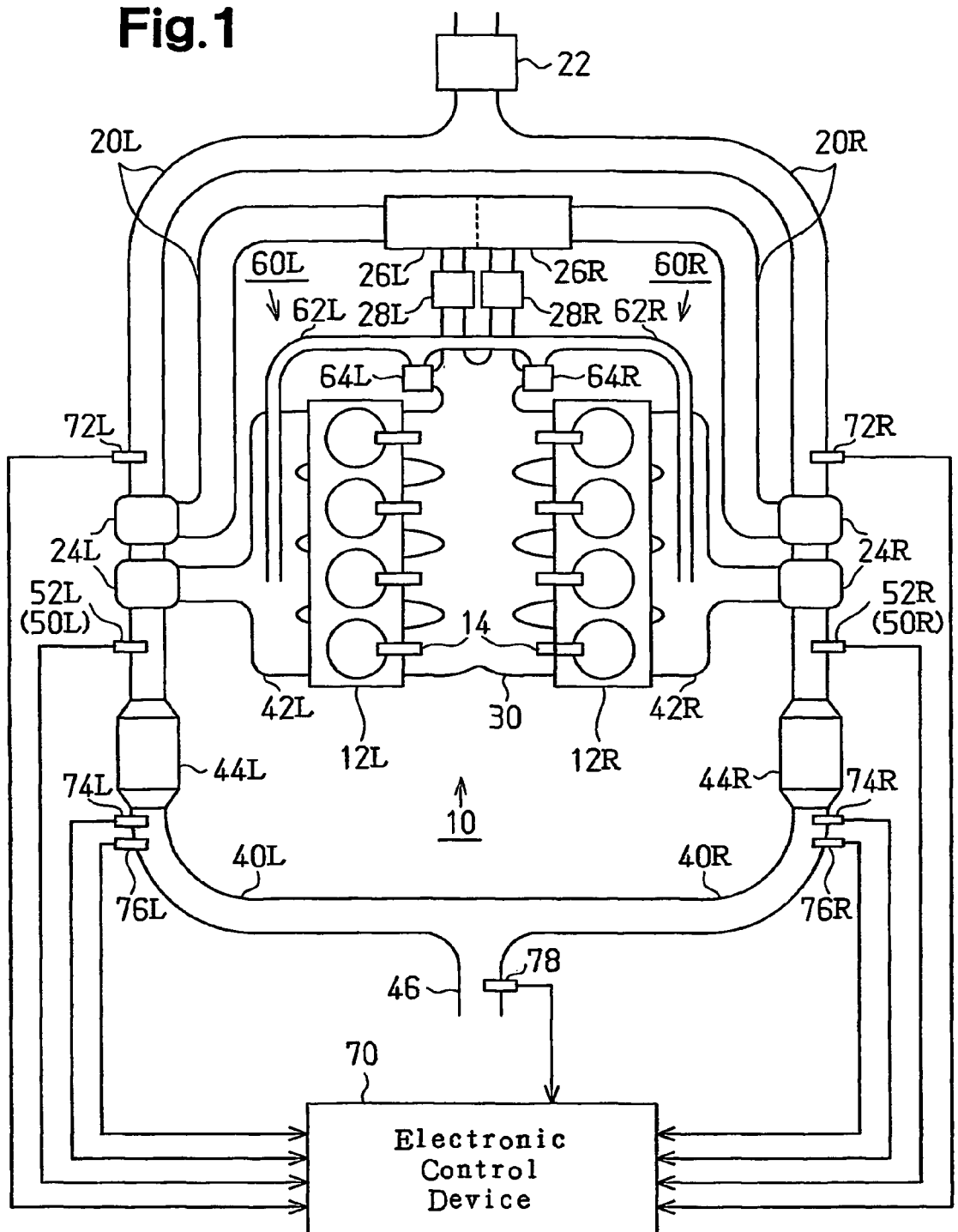
FIG. 1 is a block diagram illustrating a schematic structure of an engine system to which one embodiment of the present invention is applied.

FIG. 1 shows a schematic structure of an engine system centered on an internal combustion engine 10.

As shown in FIG. 1, the internal combustion engine 10 is provided with injectors 14. Each injector 14 corresponds to one of cylinders and directly injects fuel into corresponding one of combustion chambers. In the internal combustion engine 10, a first intake passage 20R and a first exhaust passage 40R are provided corresponding to a group of cylinders of a first bank 12R. Likewise, a second intake passage 20L and a second exhaust passage 40L are provided corresponding to a group of cylinders of a second bank 12L.

Hereinafter, the intake passages 20R, 20L will be described.

A common air cleaner 22 is located at the most upstream section of the intake passages 20R, 20L. The intake passages 20R, 20L are divided downstream of the air cleaner 22. The intake passages 20R, 20L include, in the order from the upstream end, superchargers 24R, 24L (more specifically, compressors thereof), intercoolers 26R, 26L, intake throttle valves 28R, 28L, respectively. The superchargers 24R, 24L are exhaust-gas driven superchargers, in which turbines located in the exhaust passages 40R, 40L are rotated by the flow of exhaust gas. The turbines therefore collect energy of exhaust gas and transmit the energy to the compressors. The superchargers 24R, 24L are variable displacement superchargers, which include variable nozzle mechanisms (not shown) for controlling the amount of collected exhaust energy.

The intake passages 20R, 20L are connected to a common intake manifold 30. Intake air that passes through the intake passages 20R, 20L is collected in the intake manifold 30 once and drawn into cylinders of each bank 12R, 12L.

The exhaust passages 40R, 40L will now be described.

The exhaust passages 40R, 40L include, in the order from the upstream end, exhaust manifolds 42R, 42L, the superchargers 24R, 24L (more specifically, the turbines), exhaust purifying catalysts 44R, 44L, respectively. The exhaust passages 40R, 40L merge into a single passage (merged passage 46) downstream of the exhaust purifying catalysts 44R, 44L.

The exhaust purifying catalysts 44R, 44L function as nitrogen oxides (NOx) storage-reduction catalysts and filters. When exhaust gas is regarded as an oxidizing atmosphere (lean) during a normal operation of the internal combustion engine 10, the NOx storage-reduction catalyst stores NOx. When exhaust gas is regarded as a reducing atmosphere (stoichiometric or rich), the NOx storage-reduction catalyst releases the stored NOx as nitrogen oxide (NO) and reduces with carbon hydride (HC) and carbon monoxide (CO). NOx is purified in this manner. On the other hand, the filter traps particulate matter (PM) in exhaust gas. Thus, active oxygen, which is generated in a high-temperature oxidizing atmosphere when NOx is stored, starts oxidizing particulate matter. Further, ambient excessive oxygen oxidizes the entire particulate matter. When exhaust gas is regarded as a reducing atmosphere, a large amount of active oxygen generated by the exhaust purifying catalysts 44R, 44L promotes oxidation of the particulate matter. Accordingly, particulate matter is purified at the same time as NOx is purified.

The exhaust passages 40R, 40L include reducing agent adding valve devices 50R, 50L, respectively. More specifically, adding valves 52R, 52L are located between the superchargers 24R, 24L and the exhaust purifying catalysts 44R, 44L in the exhaust passages 40R, 40L, respectively. The adding valves 52R, 52L are supplied with fuel from a fuel pump (not shown). When the adding valves 52R, 52L are open, reducing agent, which is fuel in this embodiment, is added to exhaust gas at sections upstream of the exhaust purifying catalysts 44R, 44L. The reducing agent is added to increase the catalyst bed temperature when temporarily changing the atmosphere of the exhaust purifying catalysts 44R, 44L to a reducing atmosphere during a purification process of NOx, when performing a process for purifying particulate matter, or when performing a process for removing sulfur oxides from the exhaust purifying catalysts 44R, 44L.

The internal combustion engine 10 includes exhaust gas recirculation devices 60R, 60L each corresponding to one of the banks 12R, 12L. The exhaust gas recirculation devices 60R, 60L return some of exhaust gas from the exhaust passages 40R, 40L to the intake passages 20R, 20L, respectively.

The exhaust gas recirculation devices 60R, 60L are constituted by exhaust gas recirculation passages 62R, 62L and exhaust gas recirculation valves 64R, 64L, respectively. The exhaust gas recirculation passages 62R, 62L connect the intake manifold 30 to the exhaust manifolds 42R, 42L, respectively. The exhaust gas recirculation valves 64R, 64 are located in the exhaust gas recirculation passages 62R, 62L, respectively. The amount of exhaust gas in the exhaust passages 40R, 40L recirculated to the intake manifold 30 is adjusted by changing the cross-sectional area of the exhaust gas recirculation passages 62R, 62L through control of the opening degree of the exhaust gas recirculation valves 64R, 64L or controlling the opening degree of the intake throttle valves 28R, 28L. The amount of recirculated exhaust gas is adjusted by controlling the opening degree of the exhaust gas recirculation valves 64R, 64L and the intake throttle valves 28R, 28L such that the exhaust gas recirculation rate (the weight % of the recirculated exhaust gas in the gas drawn into each combustion chamber) becomes equal to a target recirculation rate set in accordance with the engine load and the engine rotational speed.

Various sensors are provided in the engine system. For example, air flow meters 72R, 72L, which detect the intake air amount, are provided in the intake passages 20R, 20L upstream of the superchargers 24R, 24L, respectively. The air flow meters 72R, 72L are, for example, hot-wire air flow meters that detect the mass flow rate of intake air. An exhaust temperature sensor 74R for detecting an exhaust temperature T1 and an air-fuel ratio sensor 76R for detecting an air-fuel ratio of exhaust gas are located downstream of the first exhaust purifying catalyst 44R in the first exhaust passage 40R. Likewise, an exhaust temperature sensor 74L for detecting an exhaust temperature T2 and an air-fuel ratio sensor 76L for detecting an air-fuel ratio of exhaust gas are located downstream of the second exhaust purifying catalyst 44L in the second exhaust passage 40L. Furthermore, an exhaust temperature sensor 78 for detecting an exhaust temperature T is located in the merged passage 46.

An electronic control device 70 is mainly composed of a digital computer having a CPU, a ROM, and a RAM, and drive circuits for driving other devices. The electronic control device 70 reads output signals from the sensors and performs various computations. Based on the computation results, the electronic control device 70 executes various controls regarding the engine control. The controls include, for example, drive control of the injectors 14, operation control of the superchargers 24R, 24L (variable nozzle mechanisms), control of the opening degree of the intake throttle valves 28R, 28L, drive control of the adding valves 52R, 52L, and control of the opening degree of the exhaust gas recirculation valves 64R, 64L.

Variation might be caused in the flow rate of exhaust gas that passes through each exhaust purifying catalyst 44R, 44L due to the difference in the volume filling efficiencies of the cylinders, the difference in the flow characteristics of the exhaust gas recirculation devices 60R, 60L, and the difference in the characteristics of the superchargers 24R, 24L. The variation in the flow rate of exhaust gas causes the amount of heat received by the exhaust purifying catalyst 44R, 44L from the exhaust gas to vary, thereby varying the catalyst bed temperatures. If the flow rates of exhaust gas vary, the speed of the NOx storage and the sulfur poisoning of the exhaust purifying catalysts 44R, 44L vary.

Therefore, in the preferred embodiment, the mass flow rates G1, G2 of exhaust gas that flows through the exhaust passages 40R, 40L are individually estimated. The opening degree of each exhaust gas recirculation valve 64R, 64L is corrected such that the difference between the estimated mass flow rates G1, G2 is decreased. Accordingly, variation of the actual flow rate of exhaust gas is suppressed. In the preferred embodiment, the exhaust gas recirculation valves 64R, 64L function as catalyst control means, which is located upstream of the exhaust purifying catalysts and individually changes the state of the exhaust purifying catalysts.

First, the method for estimating the mass flow rates G1, G2 will be described.

The mass flow rate G of the merged passage 46 is computed as the sum of the mass flow rate G1 of exhaust gas that passes through the first exhaust passage 40R and the mass flow rate G2 of exhaust gas that passes through the second exhaust passage 40L as shown by the following equation (11).

$$G=G1+G2 \tag{11}$$

On the other hand, a quantity of heat Q of the exhaust gas in the merged passage 46, a quantity of heat Q1 of exhaust gas that passes through the first exhaust passage 40R, and a quantity of heat Q2 of exhaust gas that passes through the second exhaust passage 40L are represented by the following equations (12) to (14) on the assumption that the specific heat of exhaust gas is represented by a letter C.

$$Q=C \times T \times G \tag{12}$$

$$Q1=C \times T1 \times G1 \tag{13}$$

$$Q2=C \times T2 \times G2 \tag{14}$$

If the influence of decrease in the temperature of exhaust gas due to radiation of heat can be ignored, the quantity of heat Q of exhaust gas in the merged passage 46 is equal to the sum of the quantities of heat Q1, Q2 of exhaust gas that passes through the exhaust passages 40R, 40L (Q=Q1+Q2). Therefore, the following equation (15) is true.

$$G \times T = G1 \times T1 + G2 \times T2 \tag{15}$$

By solving the simultaneous equations that include the above equations (11), (15), the equations (16), (17) are obtained.

$$G1=G \times (T-T2)/(T1-T2) \tag{16}$$

$$G2=G \times (T-T1)/(T2-T1) \tag{17}$$

In fact, the temperature of exhaust gas decreases toward the downstream end by radiation of heat to the outside. That is, the quantity of heat of exhaust gas decreases toward the downstream end. Therefore, in the strict sense, the quantity of heat Q of exhaust gas in the merged passage 46 is slightly smaller than the sum of the quantities of heat Q1, Q2 of exhaust gas that passes through the exhaust passages 40R, 40L.

In the preferred embodiment, exhaust temperatures used for estimating the mass flow rates G1, G2 are the detection values of the exhaust temperatures that have been corrected. That is, the detection values are corrected to compensate for the difference in the temperature change due to radiation of heat caused by the difference between the detection positions of the temperatures with reference to the detection position of the exhaust temperature T.

More specifically, the mass flow rates G1, G2 of exhaust gas that passes through the exhaust passages 40R, 40L are estimated based on the following relational expressions (18), (19), which include "T1Δα" and "T2×β" as the exhaust temperatures.

$$G1=G \times (T-T2 \times \beta)/(T1 \times \alpha - T2 \times \beta) \tag{18}$$

$$G2=G \times (T-T1 \times \alpha)/(T2 \times \beta - T1 \times \alpha) \tag{19}$$

Values α and β are both predetermined coefficients. The coefficient α is a value that compensates for the difference of the temperature change due to radiation of heat that occurs from the detection position of the exhaust temperature T1 up to the detection position of the exhaust temperature T. The coefficient β is a value that compensates for the difference of the temperature change due to radiation of heat that occurs from the detection position of the exhaust temperature T2 up to the detection position of the exhaust temperature T. The coefficients α and β are set to positive values that are less than one in advance based on experimental results.

Therefore, when the mass flow rate G of exhaust gas in the merged passage 46 is grasped, the mass flow rates G1, G2 of exhaust gas that passes through the exhaust passages 40R, 40L are estimated using the relational expressions (18), (19) based on the detected exhaust temperatures T, T1, and T2. The total mass of exhaust gas emitted from the cylinders is equal to the sum of the mass of gas and fuel supplied to the cylinders. Therefore, the mass flow rate G of exhaust gas in the merged passage 46 is equal to the sum of the total mass of fuel injected from the injectors 14 per unit time and the mass flow rate of intake air, that is, the total mass of new air and recirculated exhaust gas supplied to the cylinders per unit time.

In this respect, in the preferred embodiment, the mass flow rate G is computed as the sum of the total mass of fuel injected from the injectors 14 per unit time and the mass flow rate of intake air. The obtained mass flow rate G is then used for computing the mass flow rates G1, G2. More specifically, a value estimated based on the amount of air (new air) detected by the air flow meters 72R, 72L and the predetermined target recirculation rate is used as the mass flow rate of intake air per unit time.

A procedure for controlling the opening degree of the exhaust gas recirculation valves 64R, 64L based on the mass flow rates G1, G2 will now be described. In the preferred embodiment, the opening degree control procedure functions as setting means for individually setting the control manner of the group of cylinders to which each exhaust purifying catalyst is connected or of the catalyst control means in accordance with the estimated flow rate of exhaust gas in the exhaust purifying catalyst.

Figure 2:
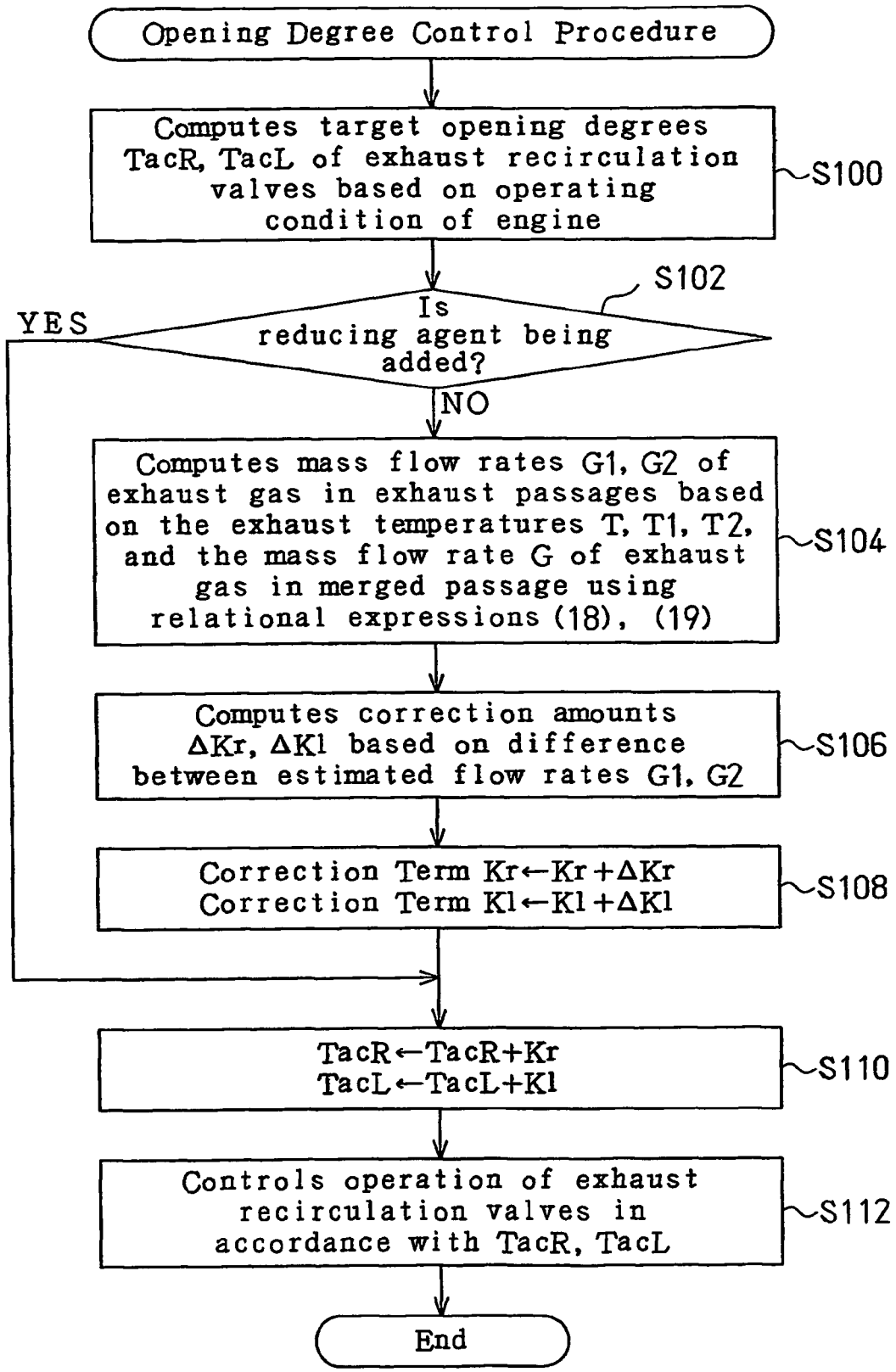
FIG. 2 is a flowchart showing specific processes of an opening degree control procedure of the preferred embodiment.

The flowchart of FIG. 2 shows a procedure for controlling the opening degree. The series of processes shown in the flowchart is executed by the electronic control device 70 at predetermined intervals.

At step S100, the electronic control device 70 computes the target recirculation rate based on the engine load and the engine rotational speed. The electronic control device 70 also computes the opening degrees (target opening degrees TacR, TacL) of the exhaust gas recirculation valves 64R, 64L appropriate for the actual exhaust gas recirculation rate to be equal to the target recirculation rate. The target opening degrees TacR, TacL are equal to each other (TacR=TacL) in this embodiment.

Then, at step S102, the electronic control device 70 determines whether the reducing agent is being added. If it is determined that the reducing agent is not added, that is, if the decision outcome of step S102 is negative, the electronic control device 70 executes a process for estimating the mass flow rates G1, G2 and a process for correcting the opening degrees of the exhaust gas recirculation valves 64R, 64L based on the difference between the estimated mass flow rates G1, G2 (steps S104 to S110).

At first, the electronic control device 70 estimates the mass flow rates G1, G2 at step S104. In this embodiment, the process of step S104 functions as estimating means for individually estimating the flow rate of exhaust gas in each exhaust purifying catalyst.

At step S106, the electronic control device 70 computes a correction amount $\Delta Kr$ of the target opening degree TacR and a correction amount $\Delta Kl$ of the target opening degree TacL based on the difference between the mass flow rates G1, G2. At step S108, the electronic control device 70 adds the correction amount $\Delta Kr$ to the correction term Kr computed in the previous process and the correction amount $\Delta Kl$ to the correction term Kl computed in the previous process to update the correction terms Kr, Kl. Furthermore, at step S110, the correction term Kr is added to the target opening degree TacR and the correction term Kl is added to the target TacL so that the target opening degrees TacR, TacL are both corrected.

The correction amounts $\Delta Kr$, $\Delta Kl$ are both obtained by a map computation. Maps used for the map computation are obtained through experiments of the relationship between the difference between the mass flow rates G1, G2 and the correction amount $\Delta Kr$ (or the correction amount $\Delta Kl$) that quickly eliminates the difference. The maps are stored in the electronic control device 70.

For example, when the mass flow rate G1 of the first exhaust passage 40R is greater than the mass flow rate G2 of the second exhaust passage 40L (G1>G2), a value that increases the opening degree of the exhaust gas recirculation valve 64R is computed as the correction amount $\Delta Kr$, and a value that decreases the opening degree of the exhaust gas recirculation valve 64L is computed as the correction amount $\Delta Kl$. Thus, while the amount of exhaust gas recirculated from the exhaust manifold 42R corresponding to the first bank 12R is increased, the amount of exhaust gas recirculated from the exhaust manifold 42L corresponding to the second bank 12L is decreased. This decreases the difference between the flow rates of exhaust gas in the exhaust passages 40R, 40L.

Contrarily, when the mass flow rate G1 of the first exhaust passage 40R is smaller than the mass flow rate G2 of the second exhaust passage 40L (G1<G2), a value that decreases the opening degree of the exhaust gas recirculation valve 64R is computed as the correction amount $\Delta Kr$, and a value that increases the opening degree of the exhaust gas recirculation valve 64L is computed as the correction amount $\Delta Kl$.

On the other hand, if it is determined that the reducing agent is being added, that is, if the decision outcome of step S102 is positive, the mass flow rates G1, G2 cannot be accurately estimated due to the influence of the added reducing agent. Therefore, the electronic control device 70 does not execute the process for estimating the mass flow rates G1, G2 (step S104) and the process for updating the correction terms Kr, Kl based on the correction amounts $\Delta Kr$, $\Delta Kl$ (steps S106, S108). In this case, at step S110, the stored correction term Kr is added to the target opening degree TacR and the stored correction term Kl is added to the target opening degree TacL to correct the target opening degrees TacR, TacL.

After the correction of the target opening degrees TacR, TacL is executed as described above, the electronic control device 70 controls the operation of the exhaust gas recirculation valves 64R, 64L in accordance with the target opening degrees TacR, TacL at step S112. The electronic control device 70 then temporarily suspends the current process.

The above described embodiment has the following advantages.

The mass flow rates G1, G2 of exhaust gas that flows through the exhaust passages 40R, 40L are individually estimated. The opening degree of each exhaust gas recirculation valve 64R, 64L is corrected such that the difference between the estimated mass flow rates G1, G2 is decreased. Accordingly, the flow rate of exhaust gas in each exhaust passage 40R, 40L is individually adjusted. This suppresses the variation of the flow rate of exhaust gas in the exhaust passages 40R, 40L during operation of the engine. This suppresses, in a suitable manner, variation in the purifying characteristics between the exhaust purifying catalysts, such as the difference in the amount of heat received from exhaust gas and the difference between the speed of the nitrogen oxides storage and the speed of sulfur poisoning.

(2) The mass flow rates G1, G2 of the exhaust passages 40R, 40L are appropriately estimated using the relational expressions (18), (19) based on the exhaust gas temperatures T, T1, and T2, and the mass flow rate G of exhaust gas in the merged passage 46.

(3) The values for estimating the mass flow rates G1, G2 are the detection values of the exhaust temperatures that have been corrected. That is, the detection values are corrected to compensate for the difference in the temperature change due to radiation of heat caused by the difference between the detection positions of the temperatures with reference to the detection position of the exhaust temperature T. Therefore, the mass flow rates G1, G2 are more accurately estimated.

(4) The mass flow rate G of exhaust gas in the merged passage 46 is computed as the sum of the total mass of fuel injected from the injectors 14 per unit time and the mass flow rate of intake air. Therefore, the mass flow rate G is accurately computed without directly detecting the mass flow rate G.

The illustrated embodiments may be modified as follows.

If the mass flow rate is precisely detected through, for example, correction using the intake temperature, an air flow meter that detects the volumetric flow rate or an intake pressure sensor may be used to detect the intake air amount.

In the preferred embodiment, the opening degrees of both exhaust gas recirculation valves 64R, 64L are corrected to suppress the variation of the exhaust flow rate. However, the opening degree of only one of the exhaust gas recirculation valves 64R, 64L may be corrected.

Instead of correcting the opening degrees of the exhaust gas recirculation valves 64R, 64L, the following structures (a) to (c) may be employed. Furthermore, the structure of correcting the opening degrees of the exhaust gas recirculation valves 64R, 64L may be combined with at least two of the structures (a) to (c). With these structures also, the flow rate of exhaust gas in the exhaust passages 40R, 40L are individually adjusted.

(a) To change the operation amounts (opening degree of nozzle) of the variable nozzle mechanisms of the superchargers 24R, 24L.

More specifically, the opening degree of nozzle of the supercharger that corresponds to the bank having a greater flow rate of exhaust gas may be decreased. This decreases the cross-section of the portion of the exhaust passage where the supercharger corresponding to the above mentioned bank is located, thereby increasing the pressure in the exhaust manifold. Accordingly, the amount of recirculated exhaust gas is increased and the flow rate of exhaust gas is decreased. Contrarily, the opening degree of nozzle of the supercharger that corresponds to the bank having a smaller flow rate of exhaust gas may be increased. This decreases the pressure in the exhaust manifold corresponding to the above mentioned bank and increases the flow rate of exhaust gas. According to this structure, the variable nozzle mechanisms function as the catalyst control means.

(b). To change the opening degrees of the intake throttle valves 28R, 28L.

More specifically, the opening degree of the intake throttle valve that corresponds to the bank having a greater flow rate of exhaust gas may be decreased. This decreases the pressure in the intake passage corresponding to the above mentioned bank, thereby increasing the amount of recirculated exhaust gas. Therefore, the flow rate of exhaust gas is decreased. Contrarily, the opening degree of the intake throttle valve that corresponds to the bank having a smaller flow rate of exhaust gas may be increased. This increases the pressure in the intake passage corresponding to the above mentioned bank, thereby decreasing the amount of recirculated exhaust gas. Therefore, the flow rate of exhaust gas is increased. According to this structure, the intake throttle valves function as the catalyst control means.

Figure 3:
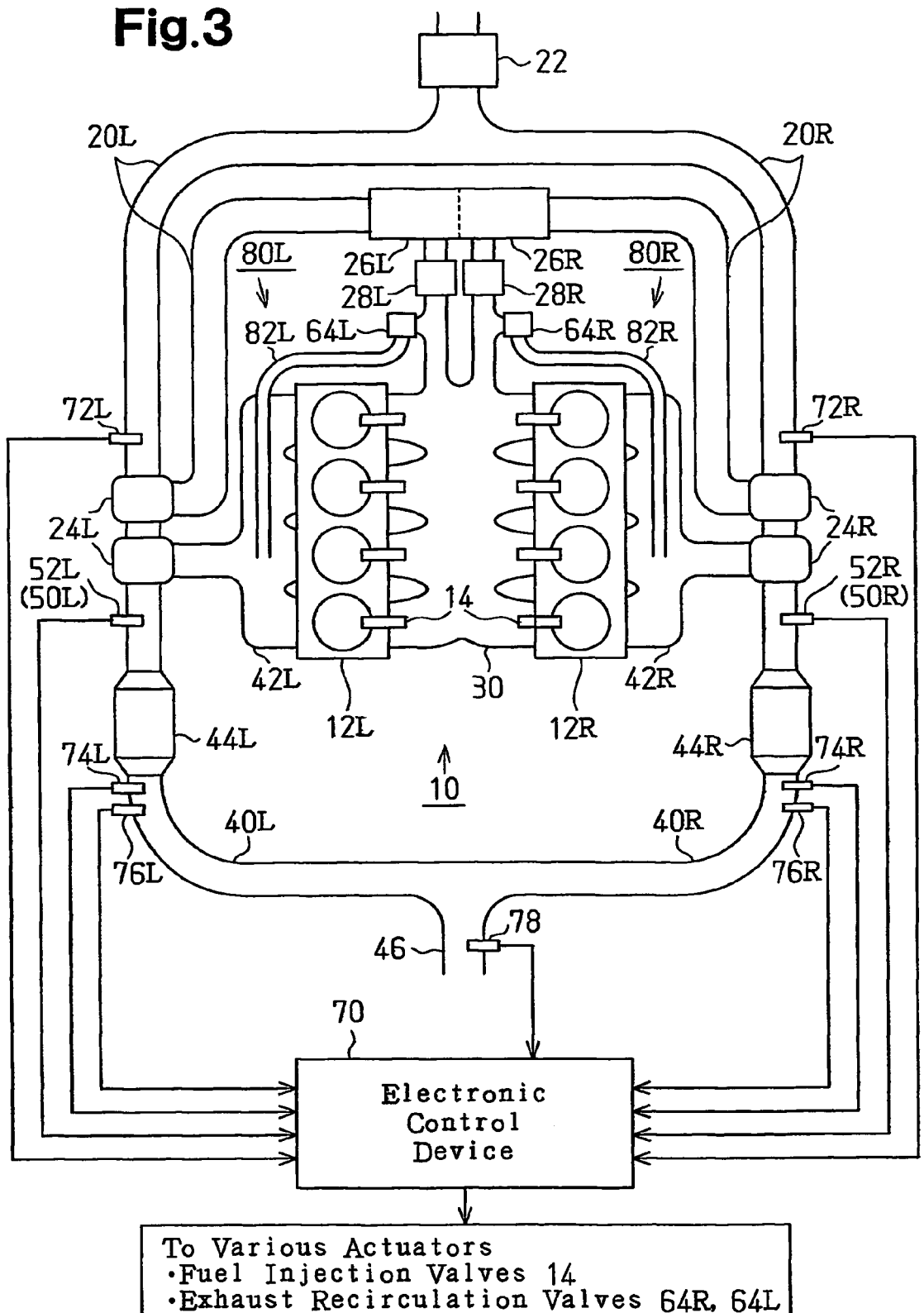
FIG. 3 is a block diagram illustrating a schematic structure of an engine system to which a modified embodiment of the present invention is applied.

According to this structure, since the pressure of the intake air in each intake passage needs to be individually changed, the structure is only applicable to the following engine system. That is, as an example shown in FIG. 3, the engine needs to employ exhaust gas recirculation devices 80R, 80L, which have independent exhaust gas recirculation passages 82R, 82L, respectively. Each exhaust gas recirculation device 80R, 80L corresponds to one of the banks 12R, 12L. In addition, the banks 12R, 12L must be provided with the intake passages 20R, 20L and the intake throttle valves 28R, 28L, respectively. An exhaust gas recirculation passage 82R is connected to one of the intake passages 20R and an exhaust gas recirculation passage 82L is connected to the other intake passage 20L.

(c) To change the valve characteristics in an internal combustion engine provided with a variable valve mechanism, which variably sets the valve characteristics such as the valve opening timing, the valve closing timing, and the lift amount of intake valves and exhaust valves.

More specifically, the amount of exhaust gas (exhaust gas returning amount) recirculated to the combustion chambers from the exhaust passage is increased by changing the valve characteristics of the valve that corresponds to the bank having a greater flow rate of exhaust gas such that the valve overlap amount is increased. The amount of recirculated exhaust gas is decreased by changing the valve characteristics of the valve that corresponds to the bank having a smaller flow rate of exhaust gas such that the overlap amount is decreased. The displacement of the engine may be decreased by decreasing the opening time of the exhaust valve that corresponds to the bank having a greater flow rate of exhaust gas. Alternatively, the displacement of the engine may be increased by increasing the opening time of the exhaust valve that corresponds to the bank having a smaller flow rate of exhaust gas. According to this structure, the variable valve mechanism functions as the catalyst control means.

Furthermore, several operational ranges of the engine may be set. Then, a specific device may be selectively used for each operational range to reduce the difference between the flow rates of exhaust gas among the operational ranges. With this structure, a device that has small influence on the operating condition of the engine and a device that easily secures the adjustment amount of the flow rate of exhaust gas may be selected for each range.

The superchargers are not limited to the variable nozzle type superchargers 24R, 24L. Other types of superchargers that supercharge cylinders by energy of exhaust gas or superchargers that are driven by an electric motor may be used as long as the superchargers are variable displacement type superchargers, which vary the pressure of exhaust gas or the amount of recirculated exhaust gas by changing the operation amount.

Figure 4:
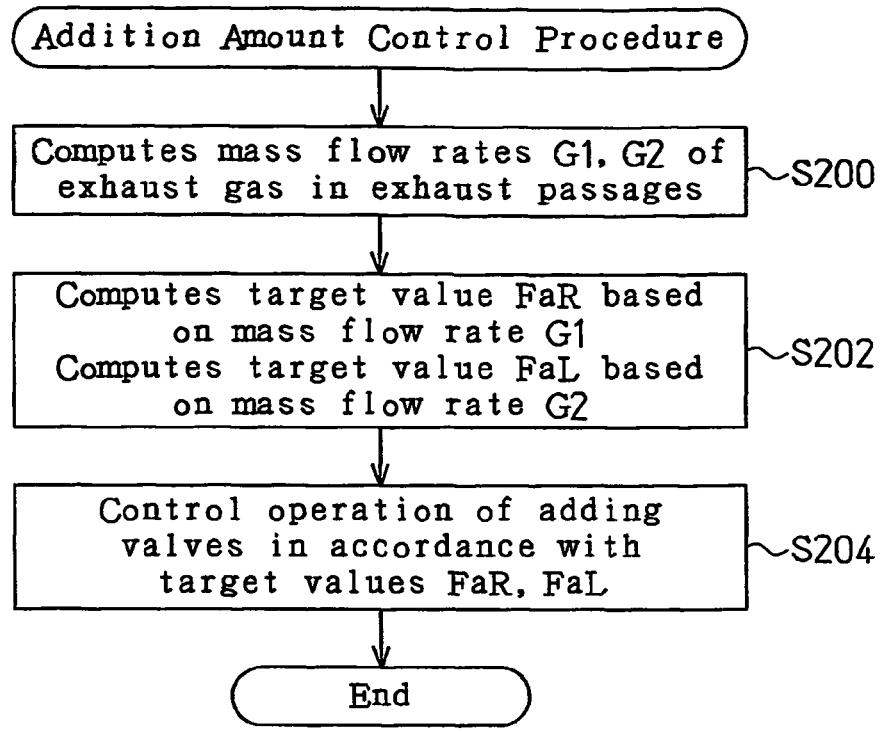
FIG. 4 is a flowchart showing a procedure for controlling an adding amount according to a modified embodiment of the present invention.

Instead of the opening degree control procedure of the exhaust gas recirculation valves 64R, 64L, an addition amount control procedure of the reducing agent adding devices 50R, 50L shown by a flowchart of FIG. 4 may be executed.

As shown in FIG. 4, at step S200, the electronic control device 70 computes the mass flow rates G1, G2 of exhaust gas that flows through the exhaust passages 40R, 40L in the above described manner. After that, at step S202, the electronic control device 70 computes a target value FaR of the reducing agent adding amount from the reducing agent adding device 50R that corresponds to the first bank 12R based on the mass flow rate G1 and the air-fuel ratio of the exhaust gas that flows through the first exhaust passage 40R. In addition, the electronic control device 70 computes a target value FaL of the reducing agent adding amount from the reducing agent adding device 50L that corresponds to the second bank 12L based on the mass flow rate G2 and the air-fuel ratio of the exhaust gas that flows through the second exhaust passage 40L. Then, at step S204, the electronic control device 70 controls the adding valves 52R, 52L in accordance with the computed target values FaR, FaL.

With this structure, the reducing agent adding amount to each exhaust passage 40R, 40L is individually set in accordance with the corresponding mass flow rate G1, G2. Therefore, even if the flow rate of exhaust gas varies per each exhaust purifying catalyst 44R, 44L, an appropriate amount of reducing agent is added to each exhaust purifying catalyst 44R, 44L. With this structure, the adding valves 52R, 52L function as the catalyst control means.

The preferred embodiment employs the reducing agent adding devices 50R, 50L that adds fuel as the reducing agent. However, reducing agent adding devices that add other material such as urea as the reducing agent may also be employed.

The values for estimating the mass flow rates G1, G2 are the detection values of the exhaust temperatures that have been corrected. That is, the detection values are corrected to compensate for the difference in the temperature change due to radiation of heat caused by the difference between the detection positions of the temperatures with reference to the detection position of the exhaust temperature T. The reference position for the correction may be arbitrarily changed to, for example, the detection position of the exhaust temperature T1, the detection position of the exhaust temperature T2, or other positions.

If the influence of the radiation of exhaust gas that is caused between the detection positions of the exhaust temperature is so small that it can be ignored, the mass flow rates G1, G2 may be estimated using the relational expressions (16), (17).

The method for estimating the flow rate of exhaust gas in the exhaust passages 40R, 40L is not limited to the above mentioned estimating method but may be changed arbitrarily. Besides estimating the flow rate of exhaust gas based on the exhaust temperature, the flow rate of exhaust gas may be estimated based on the pressure of exhaust gas or the boost pressure of the supercharger, which have a strong correlation with the flow rate of exhaust gas.

Figure 5:
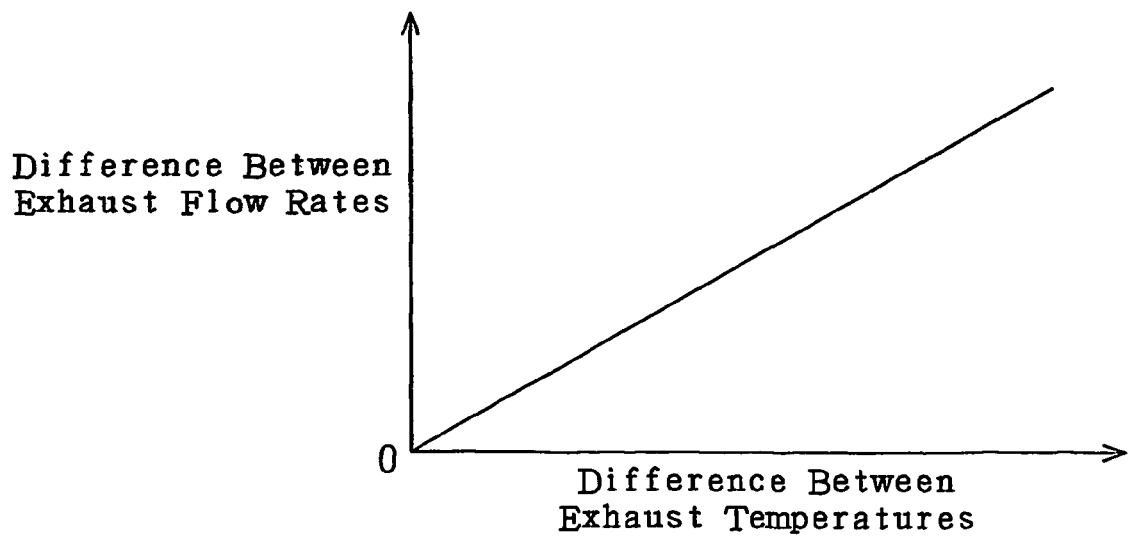
FIG. 5 is a graph showing an example of the relationship between the difference in the flow rates of exhaust gas and the differences in the temperatures of exhaust gas in exhaust passages.
Figure 6:
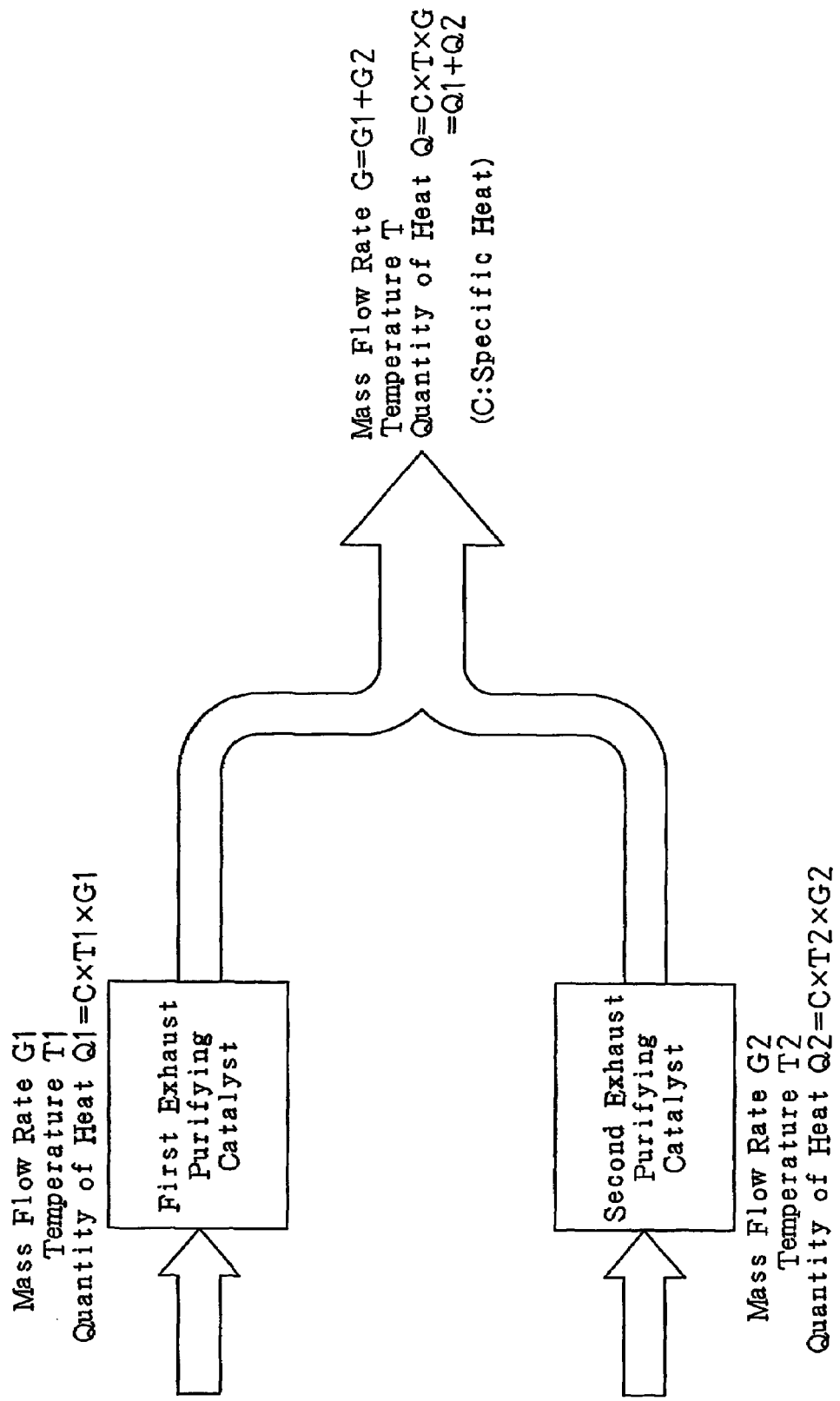
FIG. 6 is a diagram showing characteristics of exhaust gas at each part of an engine exhaust system.

The flow rate of exhaust gas in the exhaust passages 40R, 40L may be adjusted such that the difference between the exhaust temperatures T1, T2 is decreased. As an example shown in FIG. 5, as the difference between the exhaust temperatures T1, T2 is increased, the difference between the flow rates of exhaust gas in the exhaust passages 40R, 40L is increased. This has been confirmed by the inventors. Therefore, the above mentioned structure suppresses the variation of the flow rate of exhaust gas in the exhaust passages 40R, 40L. Also, the pressure of exhaust gas in the exhaust passages 40R, 40L may be detected. The flow rate of exhaust gas may be controlled such that the difference between the detected pressures of exhaust gas is decreased. With this structure, the flow rate of exhaust gas is adjusted such that the difference between the pressures of exhaust gas in the exhaust passages 40R, 40L is decreased. The pressures of exhaust gas increase as the flow rate of exhaust gas is increased. This suppresses the variation of the flow rate of exhaust gas in the exhaust passages 40R, 40L. Alternatively, the boost pressures of the superchargers 24R, 24L may be detected. The flow rate of exhaust gas may be controlled such that the difference between the detected boost pressures is decreased.

The present invention need not be applied to a V-type internal combustion engine, but is applicable to an internal combustion engine having several banks, such as a horizontal opposed engine. The present invention need not be applied to the internal combustion engine having several banks, but may be applied to any internal combustion engine having several groups of cylinders, each group being connected to a different one of exhaust purifying catalysts. The group of cylinders, may only include one cylinder.

The invention claimed is:

1. An exhaust purifying apparatus applied to an internal combustion engine, which has a plurality of groups of cylinders, each group being connected to different one of exhaust purifying catalysts, the apparatus comprising:
   estimating means for individually estimating the flow rate of exhaust gas in each exhaust purifying catalyst; and
   setting means for individually setting the control manner of each group of cylinders connected to the corresponding exhaust purifying catalyst in accordance with the estimated flow rate of exhaust gas of the exhaust purifying catalyst,
   wherein the exhaust passages are merged together after exhaust gas of each group of cylinders pass through the corresponding exhaust purifying catalyst; and wherein the estimating means estimates the flow rate of exhaust gas by computing a mass flow rate G1 of exhaust gas that passes through the first exhaust purifying catalyst and a mass flow rate G2 of exhaust gas that passes through the second exhaust purifying catalyst based on a temperature T1 of exhaust gas that passes through the first exhaust purifying catalyst, a temperature T2 of exhaust gas that passes through the second exhaust purifying catalyst a temperature T of exhaust gas after merging together, and a mass flow rate G of exhaust gas after merging together using the following equations (1) and (2): $G1=G(T-T2)/(T1-T2)$ (1) $G2=G(T-T1)/(T2-T1)$ (2).

2. The exhaust purifying apparatus for an internal combustion engine according to claim 1, wherein the internal combustion engine has a first group of cylinders connected to a first exhaust purifying catalyst and a second group of cylinders connected to a second exhaust purifying catalyst that is separate from the first exhaust purifying catalyst, the internal combustion engine also has exhaust passages each corresponding to one of the group of cylinders.

3. The exhaust purifying apparatus for an internal combustion engine according to claim 1, wherein correction is performed on detection values of the temperatures T, T1, T2 of exhaust gas for compensating for the difference between detection positions of the temperatures T, T1, T2.

4. The exhaust purifying apparatus for an internal combustion engine according to claim 1, wherein the mass flow rate G of exhaust gas after merging together is computed as the sum of the total mass of fuel injected into the internal combustion engine per unit time and the mass flow rate of intake air.

5. The exhaust purifying apparatus for an internal combustion engine according to claim 1, wherein the setting means individually adjusts the flow rate of exhaust gas per group of cylinders such that the difference between the estimated flow rates of exhaust gas in the exhaust purifying catalysts is decreased.

6. The exhaust purifying apparatus for an internal combustion engine according to claim 1, wherein the setting means individually sets the amount of reducing agent added to each exhaust purifying catalyst per group of cylinders based on the estimated flow rate of exhaust gas in the exhaust purifying catalyst.

7. The exhaust purifying apparatus for an internal combustion engine according to claim 1,
wherein the internal combustion engine includes intake passages, each corresponding to one of the first and second groups of cylinders, and an intake manifold connected commonly to the intake passages;
wherein an exhaust gas recirculation device that recirculates exhaust gas from each exhaust passage to the corresponding intake passage is provided for each group of cylinders, each exhaust gas recirculation device having an exhaust gas recirculation passage, which connects the intake manifold to the corresponding exhaust passage, and an exhaust gas recirculation valve provided in the exhaust gas recirculation passage; and
wherein the catalyst control means is constituted by the exhaust gas recirculation valves.

8. An exhaust purifying method applied to an internal combustion engine, which has a plurality of groups of cylinders, each group being connected to different one of exhaust purifying catalysts and also has exhaust passages each corresponding to one of the groups of the cylinders, wherein the exhaust passages are merged together after exhaust gas of each group of the cylinders passes through the corresponding exhaust purifying catalyst, the method comprising:
individually estimating the flow rate of exhaust gas in each exhaust purifying catalyst; and
individually setting the control manner of each group of cylinders connected to the corresponding exhaust purifying catalyst in accordance with the estimated flow rate of exhaust gas of the exhaust purifying catalyst,
wherein the flow rate of exhaust gas is estimated by computing a mass flow rate $G1$ of exhaust gas that passes through the first exhaust purifying catalyst and a mass flow rate $G2$ of exhaust gas that passes through the second exhaust purifying catalyst based on a temperature $T1$ of exhaust gas that passes through the first exhaust purifying catalyst, a temperature $T2$ of exhaust gas that passes through the second exhaust purifying catalyst, a temperature $T$ of exhaust gas after merging together, and a mass flow rate $G$ of exhaust gas after merging together using the following equations (1) and (2):

$$G1 = G \times (T-T2)/(T1-T2) \tag{1}$$

$$G2 = G \times (T-T1)/(T2-T1) \tag{2}.$$

* * * * *

UNITED STATES PATENT AND TRADEMARK OFFICE
CERTIFICATE OF CORRECTION

PATENT NO. : 7,665,297 B2 Page 1 of 1
APPLICATION NO. : 10/558681
DATED : February 23, 2010
INVENTOR(S) : Suzuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Seventh Day of December, 2010

David J. Kappos
*Director of the United States Patent and Trademark Office*